May 9, 1944.                H. R. GRAYBILL                2,348,251
                              ANIMAL TRAP
                          Filed Aug. 27, 1941            4 Sheets-Sheet 1
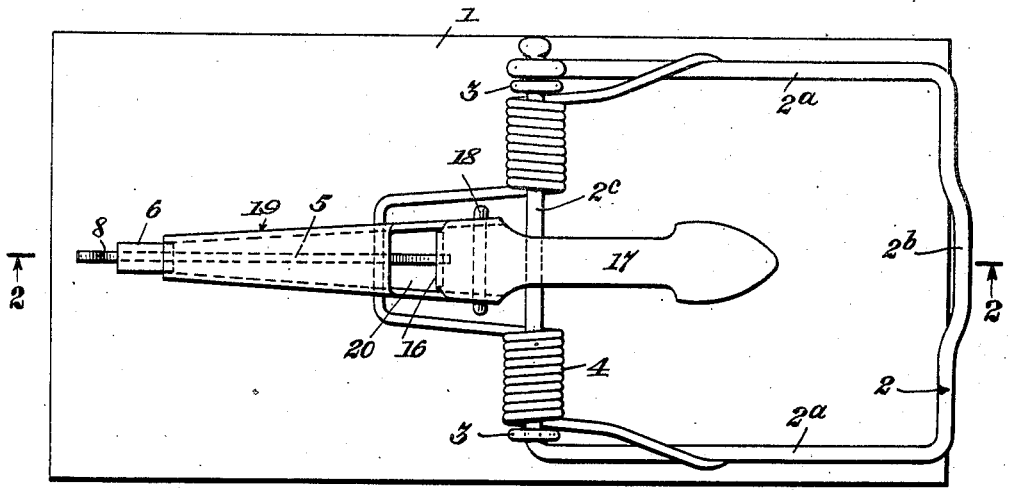
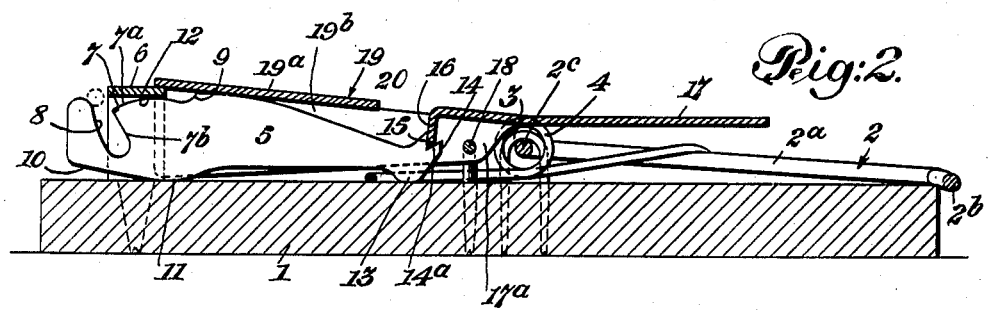
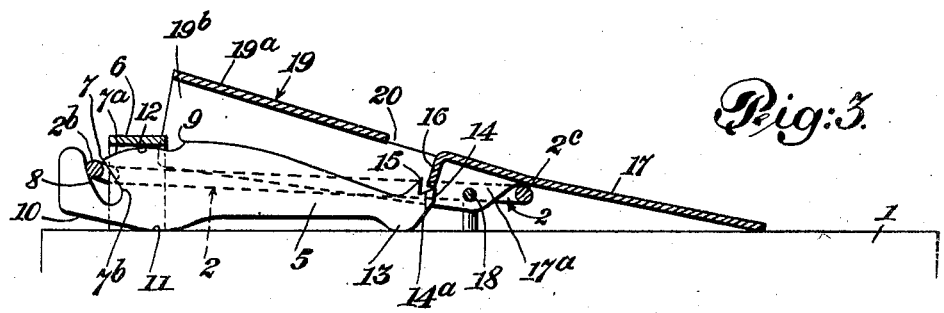
INVENTOR
Hershey Roy Graybill
BY
Louis Prescott Whitaker
ATTORNEY INVENTOR
Hershey Roy Graybill
BY Louis Prevost Whitaker
ATTORNEY

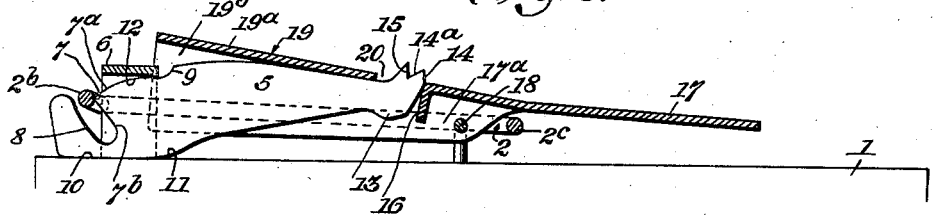
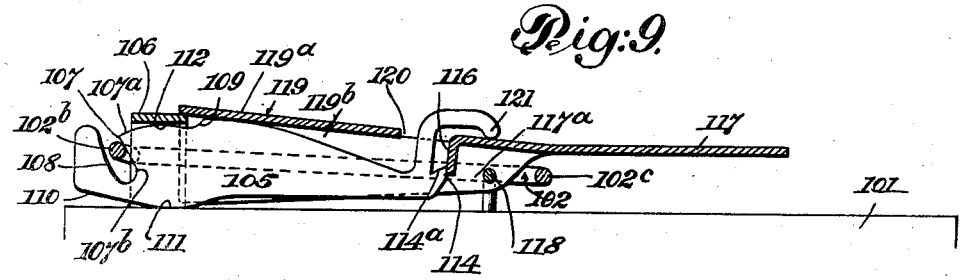
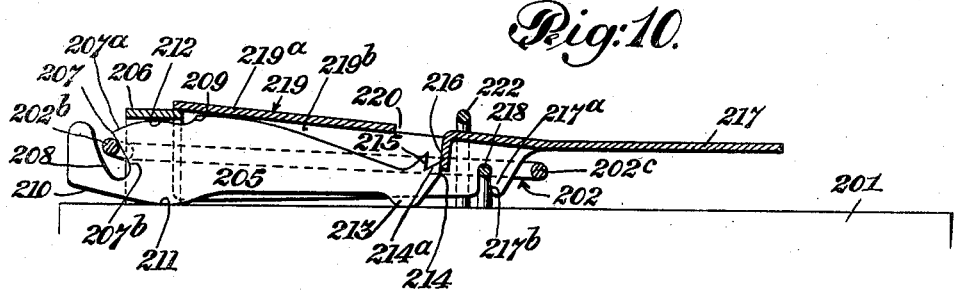
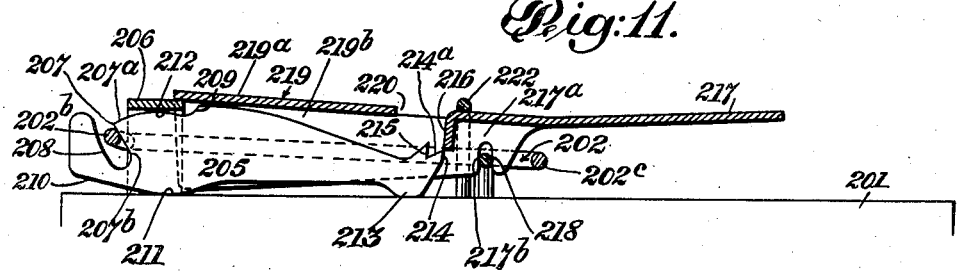
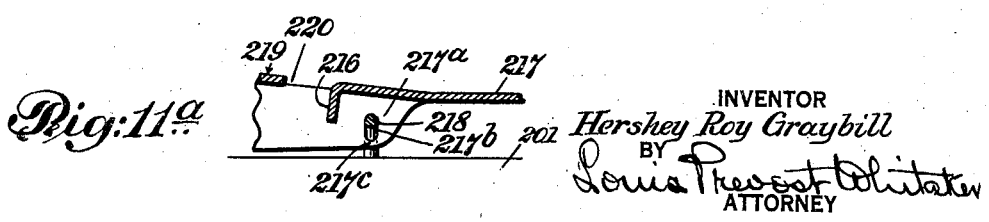

May 9, 1944.  H. R. GRAYBILL  2,348,251
ANIMAL TRAP
Filed Aug. 27, 1941    4 Sheets-Sheet 4
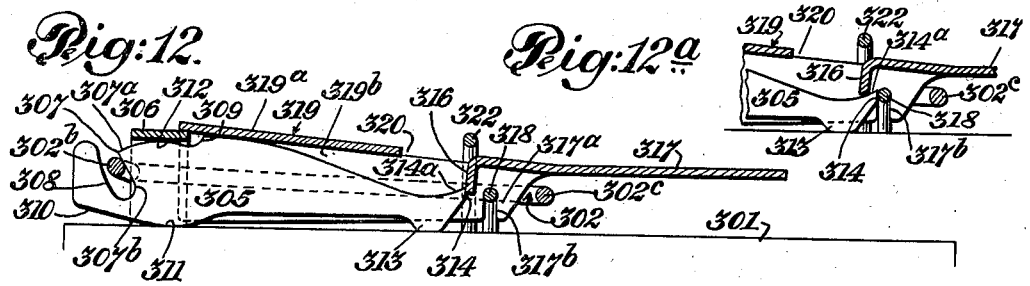
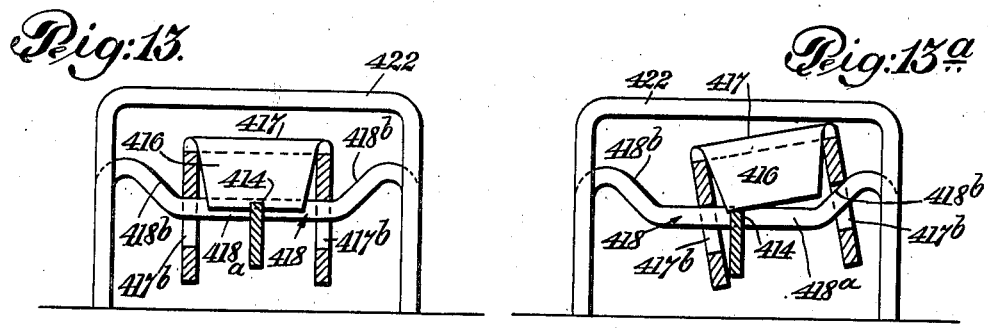
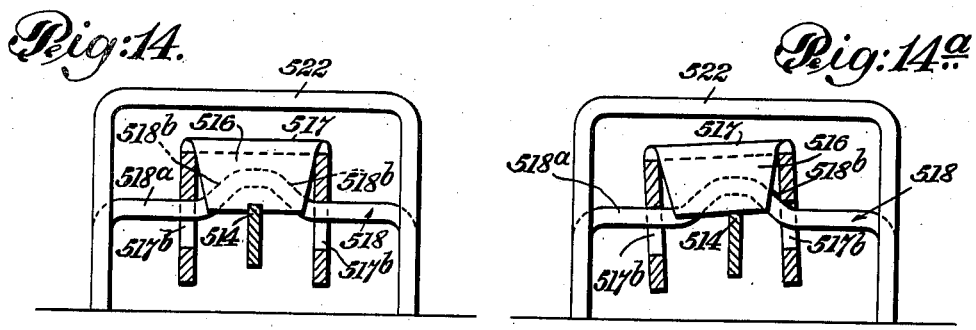
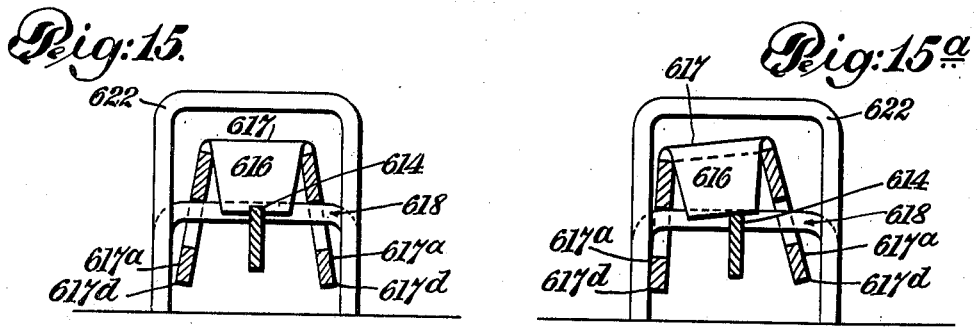
INVENTOR
Hershey Roy Graybill
BY
Louis Theodot Whitaker
ATTORNEY Patented May 9, 1944

2,348,251

UNITED STATES PATENT OFFICE 2,348,251

ANIMAL TRAP

Hershey Roy Graybill, Manheim, Pa., assignor to Animal Trap Company of America, Lititz, Pa., a corporation of Pennsylvania Application August 27, 1941, Serial No. 408,431

17 Claims. (Cl. 43—83.5)

My invention consists in the novel features hereinafter described, reference being had to the accompanying drawings which illustrate several forms in which I have contemplated embodying my invention, and the said invention is fully disclosed in the following description and claims.

My invention relates to an improved trap for rodents such as mice and rats and other small animals. It is an object of the invention to provide a trap that is of simple construction, is easily assembled and has parts so arranged as to permit considerable tolerance in forming and assembling the parts while still maintaining accuracy of operation. It is also an object of the invention to provide a trap in which cooperating parts are arranged to protect one another from injury in handling. Another object of the invention is to provide an automatically set trap having a unitary bait pedal and counterweight which can be released by movement of the bait pedal either upwardly or downwardly or, if desired, by movement of the bait pedal vertically or laterally in either direction. A further object of the invention is to provide an automatically setting trap that can be set merely by moving the jaw or other animal gripping means to set position regardless of the initial position of the bait pedal and locking plate.

Other objects and advantages of the invention will be apparent from the following description of the trap, selected by way of example to illustrate the invention and shown in the accompanying drawings, in which Fig. 1 is a top plan view of a trap in accordance with the invention showing the trap in sprung position.

Fig. 2 is a vertical sectional view taken on the line 2—2 in Fig. 1.

Figs. 3, 4 and 5 are similar sectional views showing successive steps in setting the trap, certain parts of the trap being omitted for the sake of clearness.

Figs. 7 and 8 are similar sectional views showing successive steps in setting the trap when the locking plate is initially in locked position.

Fig. 9 is a similar sectional view showing a modification.

Figs. 10 and 11 are similar sectional views of a further modification.

Fig. 11a is a fragmentary sectional view showing a slight modification of the trap shown in Figs. 10 and 11.

Figs. 12 and 12a are similar sectional views showing a further modification.

Figure 4:
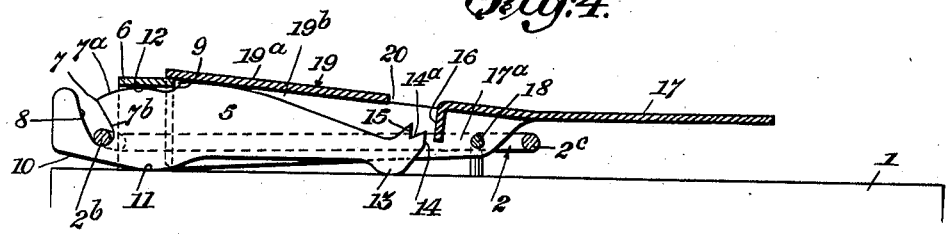

Fig. 13 is a diagrammatic vertical sectional view taken on a line extending transversely of the trap just to the rear (left) of the trigger portion of the bait pedal and looking towards said trigger portion, showing a further modification of the trap of Figs. 10 and 11 whereby the trap may be released by movement of the bait pedal vertically or laterally in either direction, i. e., four way release.

Fig. 13a is a view similar to Fig. 13 showing the bait pedal in position to release the trap.

Figs. 14 and 14a are diagrammatic views similar to Figs. 13 and 13a showing another modification.

Figs. 15 and 15a are diagrammatic views similar to Figs. 13 and 13a showing a further modification.

The trap shown by way of example in Figs. 1 to 8 to illustrate the invention has a base 1 which is ordinarily made of wood, but which may be made of any other suitable material upon which the various parts of the trap are mounted. The animal gripping means, in this instance a jaw 2, is preferably of the usual bail form comprising a single piece of metal bent to form the side arms 2a, the cross bar or striker 2b and the pivot shaft 2c. The jaw is pivotally mounted on the base by means of staples 3 engaging the pivot shaft 2c and is actuated by a suitable spring, for example, a double coil spring 4, as shown, which tends to swing the jaw from the set position shown in Fig. 5 to the sprung position shown in Figs. 1 and 2.

To hold the jaw in set position (Fig. 5) against the action of its spring, there is provided a longitudinally movable locking plate 5, which is unattached to the base, but is guided by a guiding member 6 which may conveniently be in the form of a sheet metal staple straddling the locking plate and driven into the base. The locking plate is so shaped and mounted that it can be slipped into operative position after the staple 6 has been driven and clenched, thereby facilitating the assembling of the trap.

Figure 7:
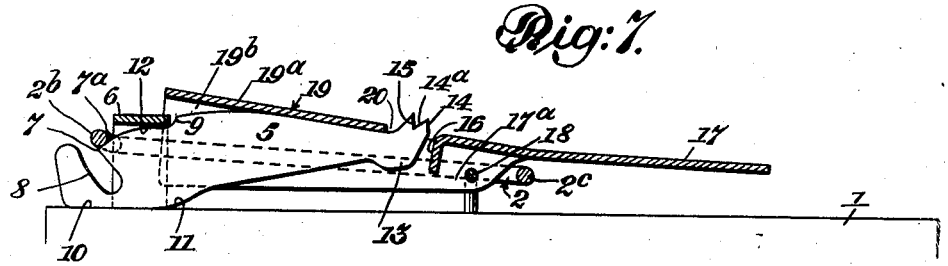

The rear end of the locking plate extends rearwardly of the guide 6 when in operative position and is provided with an open slot, the front edge of which is shaped to provide a detent 7 having an upper cam surface 7a and a lower cam surface 7b. The rear edge of the slot forms a cam surface which is inclined rearwardly and upwardly and is engageable by the jaw to move the locking plate to the rear in setting the trap. A stop 9 is preferably provided for limiting the rearward movement of the locking plate. The lower edge of the rear end of the locking plate is inclined upwardly as indicated at 10, forming a fulcrum indicated at 11 so that in certain circumstances hereinafter explained, downward pressure of the jaw 2 on the rear end of the locking plate will rock the locking plate about the fulcrum 11 to raise the forward end as illustrated in Fig. 7. The opposite upper edge of the locking plate is curved as indicated at 12, to form a second fulcrum engaging the guide 6 to hold the rear end of the locking plate against upward movement while not interfering with limited rocking of the locking plate to raise the forward end.

It will be seen that with the trap in set position (Fig. 5) the upward force exerted by the spring actuated jaw 2 on the detent 7 tends to rock the locking plate about the fulcrum 12 in a clockwise direction, thereby exerting a downward force on the forward end of the locking plate. To counteract this rocking moment means is provided for supporting the forward end of the locking plate against the downwardly directed force exerted upon it, and maintaining said end at a constant level during movement of the locking plate from the set position shown in Fig. 5 to the released position shown in Fig. 2. In the embodiment illustrated in Figs. 1 to 8, the means for supporting the forward end of the locking plate comprises a downwardly extending portion 13 which rests on the base of the trap. It will be understood that the force exerted on the locking plate by the spring actuated jaw as well as the weight of the locking plate itself, tends to maintain the forward end portion of the locking plate in contact with the base and hence at a constant level.

By reason of the lower cam surface 7b of the detent 7 the upward pressure of the spring actuated jaw against the cam surface when the trap is in set position also tends to move the locking plate longitudinally in a forward direction. When the trap is in set position the locking plate is held against longitudinal movement by a locking portion or abutment 14 provided at the front end of the locking plate and adapted to engage a cooperating movable trigger portion having associated therewith suitable animal actuated means for moving the trigger to release the trap. The rear edge of the locking portion 14 is formed as an inclined cam surface 14a. The front end of the locking plate may also be provided with a second abutment 15 located slightly to the rear of abutment 14 and serving as a stop to limit the forward movement of the locking plate.

In the embodiments shown in the drawings, the trigger portion 16 is formed as an integral part of an animal actuated member 17 which will be referred to as a bait pedal. The bait pedal 17 is pivotally supported on the base, for example, by a staple 18 passing through holes in downwardly extending flanges 17a of the bait pedal so that the pedal can be rocked from the set position shown in Fig. 5 to the released position shown in Fig. 3. A counterweight 19, preferably formed as a unitary part of the bait pedal, tends to rock the pedal to the position shown in Fig. 5, herein referred to as the set position of the bait pedal. The counterweight 19 is preferably of inverted U-shape in cross section with a top wall 19a and spaced side walls 19b and overlies the locking plate 5 thereby protecting it from injury in handling. The portion of the bait pedal and counterweight member overlying the forward end of the locking plate is apertured as indicated at 20 to permit the forward end of the locking plate to move up over the trigger portion 16 as illustrated in Fig. 7. The counterweight is preferably tapered rearwardly as shown in Fig. 1, and the rear end fits loosely over the staple 6 which guides the counterweight and acts as a stop limiting its downward movement. The bait pedal including the counterweight portion is thus held out of contact with the base by the staples 18 and 6. While the depths to which the staples may be driven in the base when the traps are produced by automatic machinery may vary slightly with variations in the thickness of the base, the height of the staples 18 and 6 relative to one another will always be the same, thereby maintaining the bait pedal at the proper angle regardless of variations in the thickness of the base.

As shown in the drawings, the trigger portion may be formed as a downwardly turned flange or lip between the vertical side walls of the bait pedal and counterweight member and may conveniently be formed of material removed in forming the aperture 20. In set position of the trap, the trigger portion 16 engages the locking portion 14 of the locking plate and blocks longitudinal movement of the locking plate in a forward direction, thereby holding it in locked position. It will be seen that the horizontal component of the force exerted on the locking plate by the spring actuated jaw is transmitted by the locking plate to the movable trigger portion 16. The jaw is thus held in set position by the longitudinal pressure of the locking plate against the movable trigger portion. It will be noted that in set position of the trap, the trigger portion and abutting portion of the locking plate are approximately in line with the cross-bar of the jaw and the pivot point of the bait pedal. The pressure is thus transmitted in a straight line and has no tendency to rock the bait pedal.

The locking plate is releasable from locked position to release the jaw by moving the trigger portion 16 out of the path of longitudinal movement of the locking plate. This is effected by downward pressure on the forward end of the bait pedal 17 as for example when an animal steps on the bait pedal or attempts to eat bait secured thereon causing the bait pedal to rock in a clockwise direction about its pivot. This movement of the bait pedal raises the trigger portion 16 out of engagement with the locking portion 14 of the locking plate and permits the locking plate to move forwardly to release the jaw. Forward movement of the locking plate is limited by engagement of the abutment 15 with the trigger portion of the bait pedal (Fig. 2).

Figure 5:
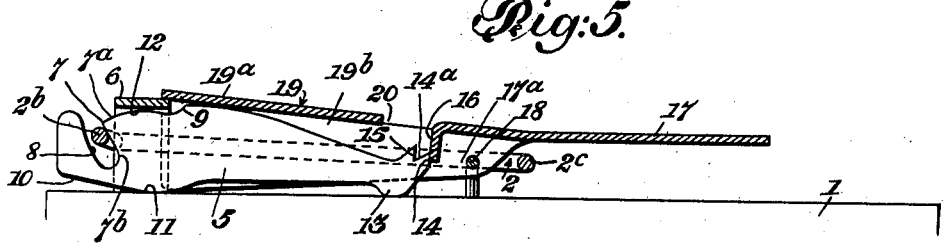
Figure 6:
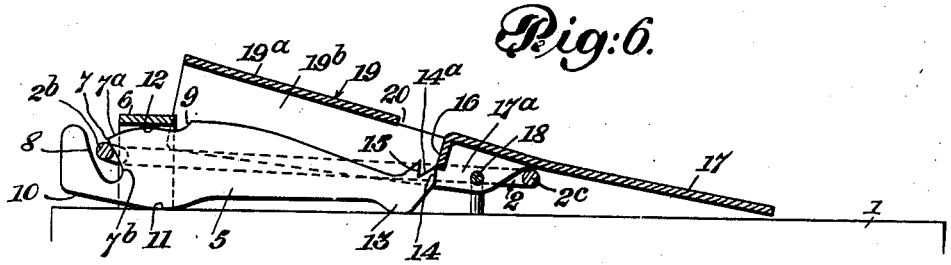
Fig. 6 is a similar sectional view showing the springing of the trap.

Successive steps in the operation of the trap are shown in Figs. 1 to 8. Figs. 1 and 2 show the trap in sprung position with the jaw in contact with the base. The locking plate 5 is shown in the position it will normally occupy in sprung position of the trap, the locking portion 14 having passed under the trigger portion 16 of the bait pedal, bringing the second abutment 15 into engagement therewith. In setting the trap, the jaw is swung about its pivot in a counterclockwise direction to the position indicated in dotted lines in Fig. 2, thereby bringing it into engagement with the cam surface 8 at the rear end of the locking plate. By reason of the inclination of this cam, further downward movement of the jaw causes the locking plate to be drawn rearwardly as shown in Fig. 3. During the rearward movement of the locking plate, the lower edge of the trigger portion 16 rides up the inclined cam surface 14a thereby rocking the bait pedal and raising the counterweight. (Fig. 3.) As soon as the locking plate has moved to the rear sufficiently for the locking portion 14 to clear the trigger portion 16, the counterweight 19 drops down, bringing the trigger portion down in front of the locking portion 14 (Fig. 4). The jaw is then allowed to move upwardly under the action of its spring 4, and engages the lower cam face 7b of the detent 7 forcing the locking plate forwardly until the locking portion 14 is pressed into contact with the trigger portion 16. Further forward movement is thereby blocked before the locking plate has moved far enough for the detent to clear the jaw and the jaw will therefore be held in set position by the pressure of the locking plate against the movable trigger portion 16 (Fig. 5).

The trap is now in fully set position. It may be sprung by an animal pressing downwardly on the forward portion of the bait pedal 17, whereupon the trigger portion 16 is moved upwardly out of the path of the locking portion 14 (Fig. 6) allowing the locking plate to move forwardly under the action of the spring actuated jaw pressing against the lower cam face 7b of the detent 7. As soon as the locking plate has moved forwardly, sufficiently for the detent to clear the jaw, the jaw is released and forceably swung to the position shown in Fig. 2, thereby striking the animal that has sprung the trap. It will be noted that in moving from the locked position shown in Fig. 5 to the released position shown in Fig. 2, the forward end of the locking plate remains at the same level. Release of the jaw is thus accomplished not by rocking the locking plate, but by moving the movable trigger portion 16 out of the path of the locking portion 14, thereby permitting rectilinear longitudinal movement of the locking plate in a forward direction.

A feature of this invention is that the trap can be automatically set merely by swinging the jaw to set position regardless of the initial position of the bait pedal and locking plate. The setting of the trap from a position in which the locking plate is in its normal released position has been described in conjunction with Figs. 2 to 6. Figs. 7 and 8 illustrate the automatic setting of the trap when the locking plate is initially in locked position so that the forward movement of the locking plate required for the jaw to pass over the detent 7 is blocked by the trigger portion 16 of the bait pedal. In this event the jaw upon being swung towards set position strikes the upper cam surface 7a of the detent 7 and rocks the locking plate in a counterclockwise direction about the fulcrum 11, causing the forward end of the locking plate to be lifted up through the aperture 20 (Fig. 7). The locking portion 14 will thereupon pass over the top of the trigger portion 16 permitting sufficient forward movement of the locking plate by pressure of the jaw on the cam surface 7a to allow the jaw to pass down over the detent 7. Further downward movement of the jaw into contact with the cam surface 8 will draw the locking plate rearwardly as in Fig. 4, permitting it to drop down to its normal position if it has not already done so by its own weight and by the added weight of the counterweight of the bait pedal resting on it. The jaw is then allowed to move upwardly under the action of the spring and upon engagement with the lower cam surface 7b of the detent will press the locking plate against the trigger portion 16 and will thereby be held in set position. The setting of the trap is thus entirely automatic whether the locking plate happens to be in locked or in released position.

In Fig. 9 there is shown another embodiment of the invention in which like parts are designated by the same reference numerals as in Figs. 1 to 8 with the addition of 100. The embodiment shown in Fig. 9 differs from that of Figs. 1 to 8 in that the means for supporting the forward end of the locking plate comprises an arm 121 which rests on the bait pedal approximately over its pivot point. As the front end of the locking plate is thus supported by the bait pedal and is held out of contact with the base, the proper positioning of the locking portion 114 relative to the trigger portion 116 of the bait pedal is insured irrespective of any variations of the depth to which the pivot staple 118 may be driven into the base. As the arm 121 rests on the bait pedal at a point approximately over the pivot where there is little or no up and down movement when the bait pedal is depressed, the locking plate is held in approximately level position at all times. The supporting arm 121 may, if desired, be extended so as to bear on the bait pedal forwardly of the pivot, whereupon depression of the bait pedal will simultaneously raise the trigger portion 116 and lower the locking portion 114 of the locking plate making the trap more sensitive. It will be noted that the arm 121 in addition to supporting the forward end of the locking plate acts as an abutment limiting the forward movement of the locking plate when the locking portion 114 is released and passes underneath trigger portion 116. The operation of the trap is the same as that of the embodiment shown in Figs. 1 to 8. As with the embodiment previously described, the trap can be automatically set with the locking plate and bait pedal in any position.

Another embodiment of the invention is shown in Figs. 10 and 11 in which corresponding parts are given the same reference numerals as in Figs. 1 to 8 with the addition of 200. The embodiment shown in Figs. 10 and 11 illustrate how the trap of the present invention can be made double-acting, i. e., releasable by either upward or downward movement of the bait pedal merely by making the pivot holes of the bait pedal in the form of elongated holes or slots. Thus, the downwardly extending flanges 217a of the bait pedal may be provided with downwardly opening slots 217b which receive the pivot staple 218 and provide a pivot for the bait pedal. An additional staple 222 may be provided to limit the upward movement of the bait pedal and prevent its being accidentally displaced from the pivot staple 218. This construction has the advantage that the pivot staple 218 may be driven and clinched before the bait pedal is placed in position, thereby facilitating the assembling of the trap.

The operation in setting the trap of Figs. 10 and 11 is the same as has been described in conjunction with the preceding figures. However, the trap is more sensitive in that it can be released by either upward or downward movement of the bait pedal. With the trap in set position, Fig. 10, downward movement of the bait pedal 217 rocks the bait pedal about the pivot staple 218 and causes the trigger portion 216 to be moved up out of the path of the locking portion 214, thereby permitting the locking plate 205 to move forwardly and release the jaw. Upward movement of the bait pedal on the other hand, causes the bait pedal to be rocked about the rear end of the counterweight 219 as a pivot and likewise raises the trigger portion 216 to release the locking plate as illustrated in Fig. 11. It will be noted that the staple 222 limits the upward movement of the bait pedal and prevents it being displaced from the pivot staple 218. Fig. 11a illustrates how the staple 222 may be dispensed with merely by closing the lower end of slot 217b as indicated at 217c.

A further embodiment of the invention is shown in Figs. 12 and 12a in which corresponding parts are indicated by the same reference numerals as in Figs. 1 to 8 with the addition of 300. The trap is shown in set position in Fig. 12 and in released position in the fragmentary view of Fig. 12a. These figures illustrate how the abutment corresponding to the abutments 15 in Figs. 1 to 8 for limiting the forward movement of the locking plate may be dispensed with by properly positioning the pivot staple 318 of the bait pedal. It will be seen that when the trigger portion 316 is raised to release the locking plate 315, the nose of the locking plate will pass under the trigger portion and will come into engagement with the pivot staple 318, thereby limiting the forward movement of the locking plate. With this arrangement of the parts it is thus unnecessary to provide the locking plate with a special stop or abutment for limiting its forward movement. The operation of the trap shown in Figs. 12 and 12a is the same as that of Figs. 10 and 11.

Figs. 13 and 13a illustrate diagrammatically how a trap in accordance with the invention and having a unitary bait pedal and counterweight may be made still more sensitive being capable of release by movement of the bait pedal upwardly, downwardly or laterally to either side without requiring any additional parts. In these figures corresponding parts are given the same reference numerals as in Figs. 1 to 8 with the addition of 400. The trap shown in Figs. 13 and 13a may be substantially the same as that shown in Figs. 10 and 11, except that the pivot staple 418 of the bait pedal and the limiting staple 422 are made somewhat wider than the bait pedal and the cross bar 418a of the pivot staple 418 is provided at either end with an upwardly sloping portion 418b leaving a central straight portion of approximately the same width as the bait pedal. In set position of the trap, the bait pedal 417 will be positioned centrally of the pivot staple 418 as shown in Fig. 13 and the trigger portion 416 will engage the locking portion 414 to hold the locking plate in locked position. Movement of the bait pedal to either side, as for example, by an animal pulling sidewise on the bait pedal causes the bait pedal to rock laterally, the upper edge of the pivot aperture 417b riding up on the inclined cam portion 418b of the pivot staple 418 and raising the trigger portion of the bait pedal sufficiently to release the locking plate as illustrated in Fig. 13a. Since the central straight portion of the cross bar 418a of the pivot staple is of approximately the same width as the bait pedal, the latter will tend to center itself when the pressure to one side is removed. It will be seen that with this structure and arrangement of the parts, the trap can be released by movement of the bait pedal laterally in either direction. Release of the trap by upward or downward movement of the bait pedal is accomplished in the same manner as described in conjunction with Figs. 10 and 11. The invention thus provides an automatically setting four way release trap of simple construction.

While the apertures in the bait pedal for receiving the pivot staple 418 are shown in the form of elongated closed slots, it will be understood that the slots may, if desired, be opened at the bottom, as upward movement of the bait pedal is limited by the staple 422. The limiting staple 422 may, if desired, be slightly narrower than the pivot staple 418 to prevent any possibility of the bait pedal sliding over the corner of the latter staple.

A similar four way trap is illustrated diagrammatically in Figs. 14 and 14a in which corresponding parts are designated by the same reference numerals as in Figs. 1 to 8 with the addition of 500. The trap illustrated in Figs. 14 and 14a differs from that of Figs. 13 and 13a in that the upwardly inclined portions 518b are located centrally of the cross-bar 518a of the pivot staple 518 instead of adjacent its end. Fig. 14 shows the parts in the positions they would occupy in set position of the trap, while Fig. 14a shows the release of the trap by lateral pressure on the bait pedal. It will be seen that when the bait pedal is pressed laterally to either side, it will ride up on one of the inclined cam surfaces 518b of the pivot staple, rocking as in the previously described form, on the staple and lifting the bait pedal and trigger portion sufficiently for the latter to clear the locking portion 514 of the locking plate and thereby release the trap. The opposed inclined surfaces 518b of the pivot staple tend to center the bait pedal and to restore it to the position shown in Fig. 14 when the pressure is removed. Release of the trap by upward or downward movement of the bait pedal may be effected in the same manner as in the embodiment of Figs. 10, 11 and 13.

Figs. 15 and 15a illustrate diagrammatically another way in which the trap of the present invention can be made capable of being released by movement of the bait pedal upwardly, downwardly or laterally in either direction. In these figures corresponding parts are designated by the same reference numerals as Figs. 1 to 8 with the addition of 600. In the embodiment shown in Figs. 15 and 15a the downwardly extending flange portions 617a of the bait pedal 617 are flared outwardly so that the outer faces of the flanges are inclined rather than vertical. In set position of the trap the bait pedal assumes the position shown in Fig. 15 with the trigger portion 616 engaging the locking portion 614 of the locking plate. Lateral movement of the bait pedal in either direction brings the projecting lower edge 617d of the downwardly extending flange portion 617a into contact with one of the side arms of the staple 622 causing the bait pedal to rock as illustrated in Fig. 15a. It will be seen that the rocking of the bait pedal moves the trigger portion 616 out of the path of the locking portion 614 of the locking plate, thereby releasing the trap. The trap is also releasable by upward or downward movement of the bait pedal in the same manner as the trap of Figs. 10 and 11.

It will be understood that the slots provided in the bait pedal for receiving the pivot staple in the embodiment of Figs. 14 and 15 may be open at the bottom, if preferred. The embodiments shown in the drawings are intended merely to illustrate the invention and are susceptible of modification as desired.

What I claim and desire to secure by Letters Patent is:

1. In a trap, the combination of a base, a pivoted spring actuated jaw, a counterweighted bait pedal having a trigger portion, means for holding the bait pedal out of contact with said base, and a locking plate having a detent portion for holding the jaw in set position and a trigger engaging portion which is supported by the bait pedal in cooperative relation therewith and out of contact with the base.

2. In an automatically setting trap, the combination of a base, a pivoted spring actuated jaw, a unitary counterweighted bait pedal having a trigger portion and a locking plate for holding the jaw in set position by pressure against said trigger portion in a direction longitudinally of said locking plate, said locking plate being released for longitudinal movement by movement of the bait pedal upwardly, downwardly or laterally in either direction.

3. In a trap, the combination of a base, a pivoted spring actuated jaw, a locking plate having cam portions coating with the jaw to move the locking plate longitudinally in both directions solely by cam action, including a cam detent for holding the jaw in set position, a bait pedal having a trigger portion located between the pivotal axis of the jaw and the detent of the locking plate, and adapted to block longitudinal movement of the locking plate and hold it in locked position and means for moving the trigger portion out of the path of the locking plate to release the trap.

4. In a trap, the combination of a base, a pivoted spring actuated jaw, a longitudinally movable locking plate for holding the jaw in set position, and a bait pedal having a trigger portion adapted to block longitudinal movement of the locking plate and hold it in locked position said trigger portion being moved out of the path of the locking plate by movement of the forward end of the bait pedal vertically or laterally in either direction to release the trap.

5. In a trap, the combination of a base, a pivoted spring actuated jaw, a bait pedal having a trigger portion, a staple secured to the base and pivotally supporting said bait pedal, and a longitudinally movable locking plate for holding the jaw in set position by pressure against the trigger portion of the bait pedal in a direction longitudinal of the locking plate, said bait pedal and said pivot staple having cooperating surfaces for moving the trigger portion out of locking engagement with the locking plate to release the trap by movement of the bait pedal laterally in either direction.

6. In a trap, the combination of a base, a pivoted spring actuated jaw, a pivoted bait pedal having an integral counterweight portion and a trigger portion, a locking plate movable rectilinearly in a longitudinal direction between locked position and released position, and having a detent portion for holding the jaw in set position and a locking portion adapted to abut the trigger portion of the bait pedal to hold the locking plate in locked position, said trigger portion being movable to release the locking plate by movement of the bait pedal vertically in either direction.

7. In a trap, the combination of a base, a pivoted spring actuated jaw, a movable trigger, a longitudinally movable locking plate having cam portions coacting with the jaw to move the locking plate in both directions wholly by cam action, including a cam detent for holding the jaw when in set position, an abutment on the locking plate adapted to engage said trigger portion to hold the locking plate in locked position, means for moving the trigger portion out of the path of said abutment to permit longitudinal movement of the locking plate to a jaw releasing position and a second abutment on the locking plate adapted to engage said trigger portion to limit the longitudinal movement of the locking plate.

8. In a trap, the combination of a base, a pivoted spring actuated jaw, a longitudinally movable locking plate for holding the jaw in set position, a bait pedal having a trigger portion adapted to hold the locking plate in locked position, a member pivotally supporting the bait pedal for movement from set position to a position permitting longitudinal movement of the locking plate to release the jaw, said pivot member providing an abutment limiting said longitudinal movement of the locking plate.

9. In a trap, the combination of animal gripping means, a longitudinally movable locking plate for holding the animal gripping means in set position, a staple guiding said locking plate, a bait pedal having a trigger portion for holding the locking plate in locked position, and a staple pivotally supporting the bait pedal, the locking plate and bait pedal being insertable in operative position after said staples are in place.

10. In a trap, the combination of a base, a pivoted spring actuated jaw, a locking plate for holding the jaw in set position and movable rectilinearly in a longitudinal direction from set position to released position, a bait pedal having a trigger portion adapted to hold the locking plate in locked position and a portion overlying the locking plate, means for moving the front end of the locking plate upwardly and forwardly to release the locking plate by pressure of the jaw when setting the trap with the locking plate initially in locked position, the bait pedal being apertured to permit said movement of the locking plate.

11. In a trap, the combination of a base, a pivoted spring actuated jaw, a locking plate for holding the jaw in set position, said locking plate being movable longitudinally from a set position to a released position, a pivoted bait pedal having a trigger portion adapted to engage said locking plate to releasably hold it in locked position, and an integral counterweight portion overlying and protecting said locking plate, and a staple secured to the base and forming a guide for the locking plate and the counterweight portion of the bait pedal and forming an abutment limiting longitudinal movement of the locking plate and limiting pivotal movement of the bait pedal to support said counterweight portion out of contact with the base.

12. In a trap, the combination of animal gripping means, a pivoted bait pedal having a trigger portion movable by gravity to set position, and a longitudinally movable locking plate adapted to engage the trigger portion of the bait pedal and having cam portions coacting with said animal gripping means including a cam detent engaging the animal gripping means when in set position and tending to move the locking plate longitudinally to released position, said locking plate being movable in both directions solely by cam action and being held in set position by longitudinal pressure against said trigger portion.

13. In a trap, the combination of a base, a pivoted spring actuated jaw, a movable trigger, a freely movable and unbiased locking plate having cam portions coacting with the jaw to move said locking plate longitudinally in both directions solely by cam action, including a cam detent for holding the jaw in set position by longitudinal pressure of the locking plate against said trigger, said trigger being movable by gravity to set position and animal actuated means for moving the trigger to release the locking plate.

14. In a trap, the combination of a base, animal gripping means, a bait pedal having a trigger portion, a locking plate for holding said animal gripping means in set position by pressure against said trigger portion, said locking plate being capable of limited longitudinal movement and vertical rocking movement, and having cam surfaces engageable by said animal gripping means and the trigger portion in setting the trap to move the locking plate into set position from any position in which it may be.

15. In a trap, the combination of a base, a pivoted spring actuated jaw, a locking plate having cam portions coacting with the jaw and including a cam detent for holding the jaw in set position, said locking plate being movable rectilinearly in a longitudinal direction between set position and a jaw releasing position and being moved in both directions solely by cam action, and a bait pedal having a trigger portion adapted to engage the locking plate to hold it in set position, said trigger portion being movable by gravity to plate holding position, and being movable out of the longitudinal path of movement of the locking plate to release the trap.

16. In a trap, the combination of a base, a pivoted spring actuated jaw, a pivoted bait pedal having a trigger portion, a locking plate having at its rear end a detent for holding the jaw in set position and at its front end an abutment adapted to engage said trigger portion to hold the locking plate in locked position, the trigger portion of the bait pedal being movable vertically to release said locking plate, and means supporting the front end of the locking plate out of contact with the base and at a constant level relative to the pivot of the bait pedal.

17. In a trap, the combination of a base, a pivoted spring actuated jaw having side arms and a cross bar, a bait pedal having a trigger portion, a pivotal support for said bait pedal, said bait pedal being counterweighted to tend to rock it to its set position, a locking plate having a detent engaging the cross bar of the jaw to hold the jaw in set position and a locking portion engaging the trigger portion of the bait pedal to hold the locking plate in locked position, the point of engagement between said locking portion and said trigger portion being approximately in line with the cross bar of the jaw and the pivotal support of the bait pedal when the trap is in set position.

HERSHEY ROY GRAYBILL.